US010302941B2

(12) United States Patent
Fujita et al.

(10) Patent No.: US 10,302,941 B2
(45) Date of Patent: May 28, 2019

(54) PROJECTION-TYPE DISPLAY DEVICE, SAFE-DRIVING SUPPORT METHOD, AND SAFE-DRIVING SUPPORT PROGRAM

(71) Applicant: FUJIFILM Corporation, Tokyo (JP)

(72) Inventors: Koudai Fujita, Saitama (JP); Daisuke Ito, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 15/613,273

(22) Filed: Jun. 5, 2017

(65) Prior Publication Data
US 2017/0269364 A1 Sep. 21, 2017

Related U.S. Application Data

(63) Continuation of application No. PCT/JP2015/081627, filed on Nov. 10, 2015.

(30) Foreign Application Priority Data

Dec. 24, 2014 (JP) .................................. 2014-260513

(51) Int. Cl.
B60K 35/00 (2006.01)
G02B 27/01 (2006.01)
(Continued)

(52) U.S. Cl.
CPC .......... *G02B 27/0101* (2013.01); *B60K 35/00* (2013.01); *B60K 37/04* (2013.01);
(Continued)

(58) Field of Classification Search
CPC .............................................. G02B 27/0101
(Continued)

(56) References Cited

U.S. PATENT DOCUMENTS 4,635,033 A 1/1987 Inukai et al.
2004/0017282 A1 1/2004 Eguchi et al.
(Continued)

FOREIGN PATENT DOCUMENTS

EP 2923876 9/2015
JP S60-203545 10/1985
(Continued)

OTHER PUBLICATIONS

"International Search Report (Form PCT/ISA/210) of PCT/JP2015/081627", dated Jan. 26, 2016, with English translation thereof, pp. 1-4.
(Continued)

Primary Examiner — Cheukfan Lee
(74) Attorney, Agent, or Firm — JCIPRNET

(57) ABSTRACT

Provided are a projection-type display device, a safe-driving support method, and a non-transitory computer readable recording medium storing a safe-driving support program capable of securing safety while providing sufficient information to a driver even in a situation where a field of vision in a traveling direction of a motor vehicle is poor. An HUD includes a light modulation unit that modulates light emitted from a light source unit; a projection unit that projects the light modulated by the light modulation unit onto a combiner; a first image information generation unit that generates first image information and outputs the first image information to the light modulation unit; a second image information generation unit that generates second image information and outputs the second image information to a display device; and a control unit that controls operations of the first image information generation unit and the second image information generation unit.

25 Claims, 9 Drawing Sheets

(51) Int. Cl.
  *G03B 21/00* (2006.01)
  *B60K 37/04* (2006.01)
  *B60R 11/02* (2006.01)
  *G02B 27/18* (2006.01)
  *H04N 5/225* (2006.01)

(52) U.S. Cl.
  CPC .............. *B60R 11/02* (2013.01); *G02B 27/01* (2013.01); *G02B 27/18* (2013.01); *G03B 21/00* (2013.01); *H04N 5/225* (2013.01); *B60K 2350/2052* (2013.01); *G02B 2027/0163* (2013.01)

(58) Field of Classification Search
  USPC ........................................................ 358/471
  See application file for complete search history.

(56) References Cited

U.S. PATENT DOCUMENTS

2010/0182140 A1   7/2010   Kohno et al.
2017/0102550 A1*  4/2017   Ponomarev ........ G02B 27/0179

FOREIGN PATENT DOCUMENTS

| | | |
|---|---|---|
| JP | H05-147456 | 6/1993 |
| JP | H06-255398 | 9/1994 |
| JP | H10-100739 | 4/1998 |
| JP | H10-329627 | 12/1998 |
| JP | H11-119147 | 4/1999 |
| JP | 2004-058828 | 2/2004 |
| JP | 2005-028982 | 2/2005 |
| JP | 2008-168799 | 7/2008 |
| JP | 2013-072778 | 4/2013 |
| JP | 2013-112269 | 6/2013 |
| JP | 2013-189122 | 9/2013 |
| JP | 2014-028593 | 2/2014 |
| JP | 2014-201213 | 10/2014 |
| JP | 2014201213 | 10/2014 |
| WO | 2009047874 | 4/2009 |
| WO | 2014080521 | 5/2014 |

OTHER PUBLICATIONS

"International Preliminary Report on Patentability (Form PCT/IPEA/409) of PCT/JP2015/081627", dated Nov. 22, 2016, with English translation thereof, pp. 1-26.

* cited by examiner

FIG. 12

| TRAVELING SPEED INFORMATION | DISPLAY BRIGHTNESS | DISPLAY SIZE |
|---|---|---|
| 120 km/h OR MORE | DISPLAY ONLY WARNING MARK<br>WARNING MARK:<br>100% OF REFERENCE VALUE | DISPLAY ONLY WARNING MARK<br>WARNING MARK:<br>100% OF REFERENCE VALUE |
| 60 km/h TO 120 km/h | WARNING MARK:<br>100% OF REFERENCE VALUE<br>OTHER THAN WARNING MARK:<br>50% OF REFERENCE VALUE | WARNING MARK:<br>100% OF REFERENCE VALUE<br>OTHER THAN WARNING MARK:<br>50% OF REFERENCE VALUE |
| 60 km/h OR LESS | ENTIRE INFORMATION:<br>100% OF REFERENCE VALUE | ENTIRE INFORMATION:<br>100% OF REFERENCE VALUE |

PROJECTION-TYPE DISPLAY DEVICE, SAFE-DRIVING SUPPORT METHOD, AND SAFE-DRIVING SUPPORT PROGRAM

CROSS-REFERENCE TO RELATED APPLICATIONS

This application is a Continuation of PCT International Application No. PCT/JP2015/081627 filed on Nov. 10, 2015, which claims priority under 35 U.S.C § 119(a) to Japanese Patent Application No. 2014-260513 filed on Dec. 24, 2014. Each of the above application(s) is hereby expressly incorporated by reference, in its entirety, into the present application.

BACKGROUND OF THE INVENTION

1. Field of the Invention

The present invention relates to a projection-type display device, a safe-driving support method, and a non-transitory computer readable recording medium storing a safe-driving support program.

2. Description of the Related Art

A head-up-display (HUD) device for a motor vehicle that uses a windshield of the motor vehicle or a combiner provided in front of the windshield as a screen and projects projection light thereto to display an image is known (see JP2013-112269A, JP2013-072778A, JP2005-028982A, JP2004-058828A, JP-1411-119147A (JP1999-119147A), JP-H05-147456A (JP1993-147456A), JP2014-28593A, and JP2013-189122A). According to such an HUD, a user can visually recognize an image displayed on the windshield or the like by the projection light projected from the HUD with the image being overlapped with a scene in front of a host vehicle beyond the windshield or the like.

JP2013-112269A discloses an HUD that makes an image projected onto a windshield blurred during high speed traveling to enhance safety.

JP2013-072778A discloses an HUD that reduces the amount of information of an image projected onto a windshield when a deceleration of a motor vehicle is large to secure safety.

JP2005-028982A discloses an HUD that reduces the amount of information of an image projected onto a windshield during high speed traveling to secure safety.

JP2004-058828A discloses an HUD that increases the brightness of an image projected onto a windshield during high speed traveling.

JP-H11-119147A (JP1999-119147A) discloses an HUD that increases the size of an image projected onto a windshield during high speed traveling.

JP-H05-147456A (JP1993-147456A) discloses an HUD that reduces the size of an image projected onto a windshield during high speed traveling.

JP2014-28593A discloses an HUD that projects a half (navigation information or the like) of image light modulated by a light modulating element onto a windshield, and projects the remaining half (speed meter or the like) onto a screen in a dashboard.

JP2013-189122A discloses an HUD that projects first image light onto an upper region of a windshield, projects second image light onto a lower region of the windshield, and changes details of the first image light and the second image light depending on urgency and importance of information to be provided to a driver.

SUMMARY OF THE INVENTION

In an HUD for a motor vehicle, in consideration of transmission of an abnormality such as malfunction to a user, or transmission of a state of emergency such as shortage of gas to the user, enhancement in visibility is an important problem.

The HUDs disclosed in JP2013-112269A, JP2013-072778A, JP2005-028982A, JP2004-058828A, JP-H11-119147A (JP1999-119147A), and JP-H05-147456A (JP1993-147456A) control the brightness, the amount of information, and the size of an image to be projected, according to a traveling speed of a motor vehicle. However, in a situation in which a field of vision during high speed traveling or the like is narrowed, projection of an image onto a windshield further narrows the field of vision, which makes it difficult to sufficiently secure the safety. Further, for example, a configuration in which only a necessary minimum image is projected during high speed traveling may be considered, but in this configuration, an information amount to be transmitted to a driver becomes insufficient.

In the HUDs disclosed in JP2014-28593A and JP2013-189122A, there is a concern that in a situation in which a field of vision during high speed traveling or the like is narrowed, the field of vision is narrowed and the safety is lowered due to an image projected onto a windshield.

In consideration of the above-mentioned problems, an object of the invention is to provide a projection-type display device, a safe-driving support method, and a non-transitory computer readable recording medium storing a safe-driving support program capable of securing safety while providing sufficient information to a driver even in a situation where a field of vision in a traveling direction of a motor vehicle is poor.

According to an aspect of the invention, there is provided a projection-type display device mounted on a motor vehicle, including: a light modulation unit that modulates light emitted from a light source unit in accordance with input image information; a projection unit that projects the light modulated by the light modulation unit onto a projection surface; a first image information generation unit that generates first image information and outputs the first image information to the light modulation unit; a second image information generation unit that generates second image information and outputs the second image information to a display device mounted on the motor vehicle; and a control unit that controls operations of the first image information generation unit and the second image information generation unit, wherein the control unit performs any one of a first control for operating both the first image information generation unit and the second image information generation unit and a second control for operating only the first image information generation unit; a traveling speed information acquisition unit that acquires traveling speed information of the motor vehicle, wherein the control unit performs switching between the first control and the second control on the basis of the traveling speed information acquired by the traveling speed information acquisition unit, wherein in a case where the first control is performed, the control unit performs a control so that the information amount of the first image information generated by the first image information generation unit is smaller than the information amount of the second image information generated by the second image information generation unit and the information amount of the first image information is reduced as the traveling speed becomes faster.

According to another aspect of the invention, there is provided a safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second image information to a display device mounted on the motor vehicle, the method including: a control step of controlling operations of the first image information generation unit and the second image information generation unit, wherein in the control step, any one of a first control for operating both the first image information generation unit and the second image information generation unit and a second control for operating only the first image information generation unit is performed; a traveling speed information acquisition step of acquiring traveling speed information of the motor vehicle, wherein in the control step, switching between the first control and the second control is performed on the basis of the traveling speed information acquired in the traveling speed information acquisition step, wherein in the control step, in a case where the first control is performed, a control is performed so that the information amount of the first image information generated by the first image information generation unit is smaller than the information amount of the second image information generated by the second image information generation unit and the information amount of the first image information is reduced as the traveling speed becomes faster.

According to still another aspect of the invention, there is provided a non-transitory computer readable recording medium storing a safe-driving support program that causes a computer to execute a safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second mage information to a display device mounted on the motor vehicle, in which the safe-driving support method includes a control step of controlling operations of the first image information generation unit and the second image information generation unit, wherein in the control step, any one of a first control for operating both the first image information generation unit and the second image information generation unit and a second control for operating only the first image information generation unit is performed; a traveling speed information acquisition step of acquiring traveling speed information of the motor vehicle, wherein in the control step, switching between the first control and the second control is performed on the basis of the traveling speed information acquired in the traveling speed information acquisition step, wherein in the control step, in a case where the first control is performed, a control is performed so that the information amount of the first image information generated by the first image information generation unit is smaller than the information amount of the second image information generated by the second image information generation unit and the information amount of the first image information is reduced as the traveling speed becomes faster.

According to the invention, it is possible to provide a projection-type display device, a safe-driving support method, and a non-transitory computer readable recording medium storing a safe-driving support program capable of securing safety while providing sufficient information to a driver even in a situation where a field of vision in a traveling direction of a motor vehicle is poor.

BRIEF DESCRIPTION OF THE DRAWINGS

FIG. 12 is a diagram showing a control table in which the second control is defined.

DESCRIPTION OF THE PREFERRED EMBODIMENTS

Hereinafter, embodiments of the invention will be described with reference to the accompanying drawings.

Figure 1:
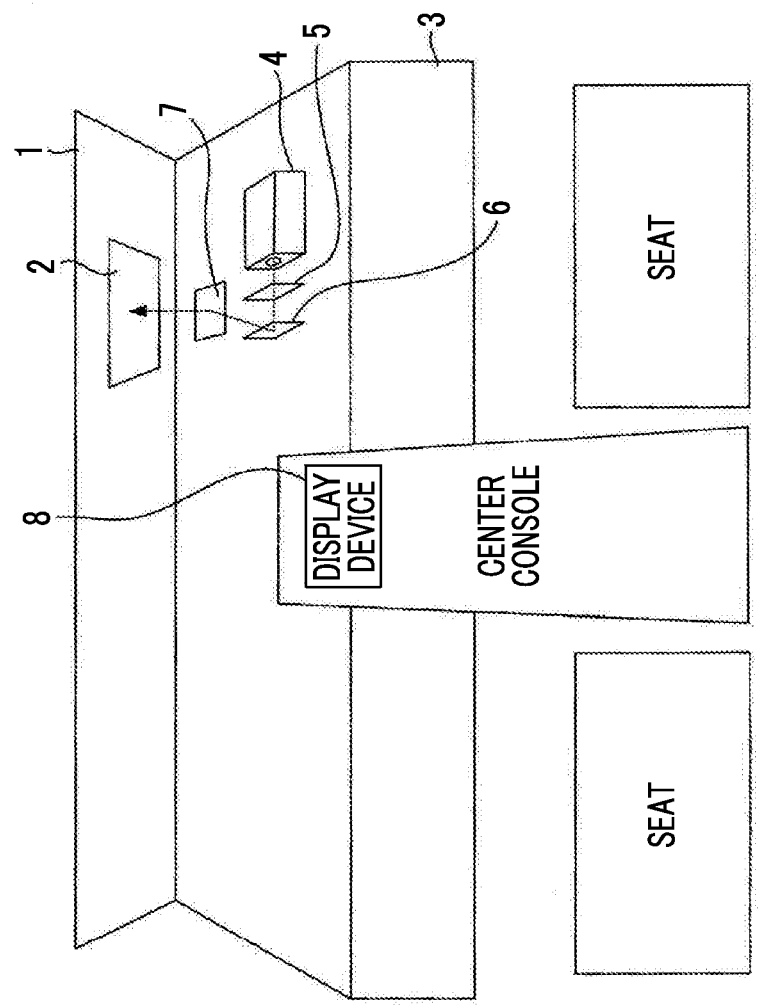
FIG. 1 is a diagram showing a configuration of an HUD which is an embodiment of a projection-type display device of the invention.

FIG. 1 is a diagram showing a configuration of an HUD which is an embodiment of a projection-type display device of the invention. The HUD is mounted on a motor vehicle.

The HUD shown in FIG. 1 includes a display unit 4 which is provided in a dashboard 3 of a motor vehicle, a projection unit including a diffuser panel 5, a reflecting mirror 6, and a magnifier 7, and a combiner 2 attached to an inner surface of a windshield 1 of the motor vehicle.

The diffuser panel 5 diffuses light corresponding to projection image data emitted from the display unit 4 to change this light to a surface light source.

The reflecting mirror 6 reflects the light diffused in the diffuser panel 5 to the magnifier 7 side.

The magnifier 7 magnifies an image based on the light reflected by the reflecting mirror 6, and projects the magnified image onto the combiner 2.

The combiner 2 is a projection surface that exists in the motor vehicle, onto which the light projected from the magnifier 7 is projected, and reflects the light. A driver of the motor vehicle can view the light reflected by the combiner 2 to visually recognize information or the like relating to driving. Further, the combiner 2 has a function of reflecting the light projected from the magnifier 7, and at the same time, transmitting light from the outside (outside world) of the windshield 1. Thus, the driver can visually recognize the image based on the light projected from the magnifier 7 and a scene of the outside world of the windshield 1 in an overlapping manner.

A display device 8 configured by a liquid crystal display or the like is provided in a center console of the motor vehicle. The display device 8 is internally connected to the display unit 4, and is able to display information or the like relating to driving acquired from the display unit 4.

Figure 2:
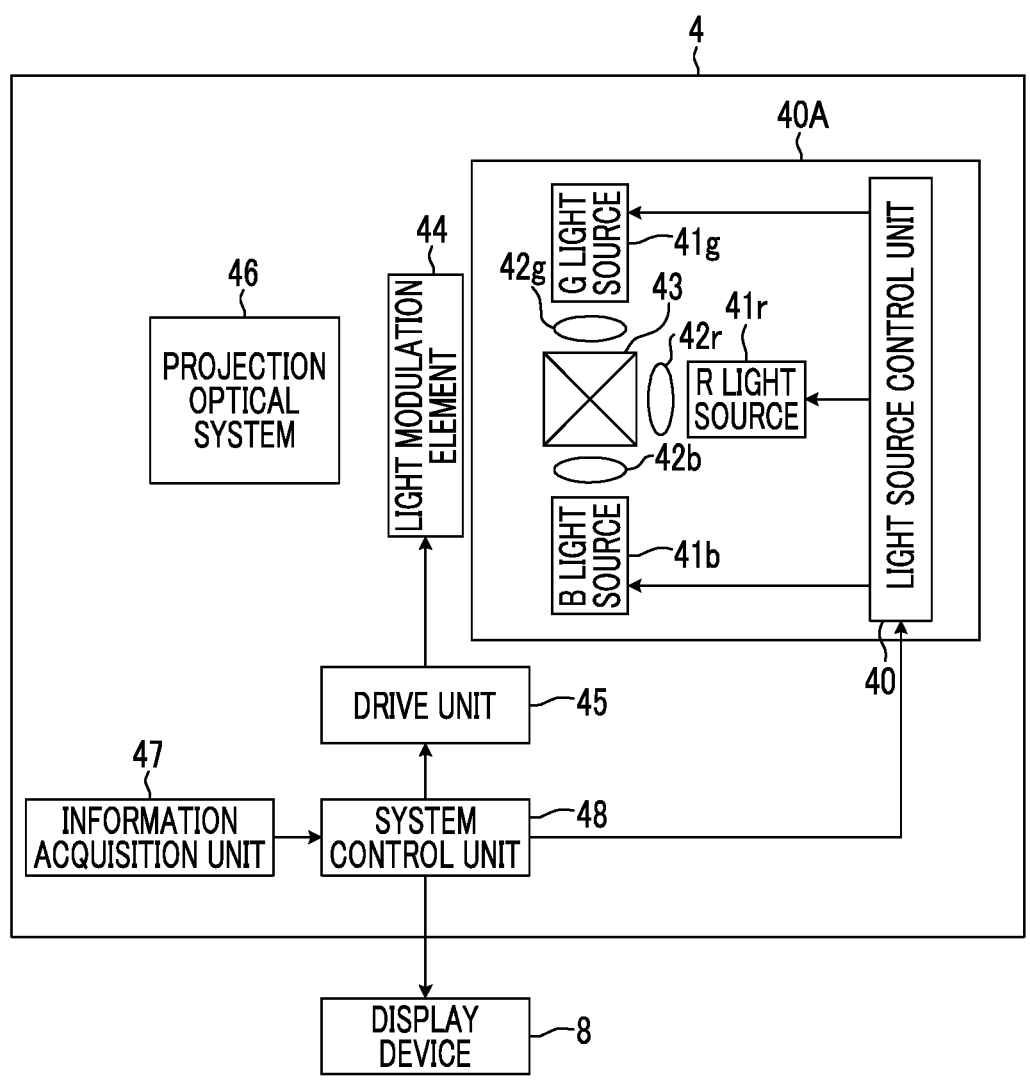
FIG. 2 is a diagram showing a configuration of a display unit shown in FIG. 1.

FIG. 2 is a diagram showing a configuration example of the display unit 4 shown in FIG. 1.

The display unit 4 includes a light source unit 40A, a light modulation element 44, a drive unit 45 that drives the light modulating element 44, a projection optical system 46, an information acquisition unit 47, and a system control unit 48 that generally controls the entire components.

The light source unit 40A includes a light source control unit 40, an R light source 41r which is a red light source that emits red light, a G light source 41g which is a green light source that emits green light, a B light source 41b which is a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43.

The dichroic prism 43 is an optical member for guiding light emitted from each of the R light source 41r, the G light source 41g, and the B light source 41b to the same optical path. As the optical element having such a function is not limited to the dichroic prism. For example, a cross dichroic mirror may be used.

The dichroic prism 43 transmits R light collimated by the collimator lens 42r, and emits the R light to the light modulating element 44. Further, the dichroic prism 43 reflects G light collimated by the collimator lens 42g, and emits the G light to the light modulating element 44. The dichroic prism 43 reflects B light collimated by the collimator lens 42b, and emits the B light to the light modulating element 44.

As the R light source 41r, the G light source 41g, and the B light source 41b, a light emitting element such as a laser or a light-emitting diode (LED) may be used, respectively. In the present embodiment, an example in which the HUD includes three light sources of the R light source 41r, the G light source 41g, and the B light source 41b is shown, but the number of light sources may be two, or four or more.

The light source control unit 40 sets the amount of light emission of each of the R light source 41r, the G light source 41g, and the B light source 41b to a predetermined light emission amount pattern, and performs a control for sequentially emitting light from the R light source 41r, the G light source 41g, and the B light source 41b in accordance with the light emission amount patterns.

The light modulating element 44 modulates light emitted from the dichroic prism 43, and emits light corresponding to image information (red image light, blue image light, and green image light) to the projection optical system 46.

As the light modulating element 44, for example, liquid crystal on silicon (LCOS), a digital mirror device (DMD), micro electro mechanical systems (MEMS) element, a liquid crystal display device, or the like may be used.

The drive unit 45 drives the light modulating element 44 according to image information input from the system control unit 48, and causes the light modulating element 44 to emit light (red image light, blue image light, and blue image light) corresponding to the image information to the projection optical system 46. The drive unit 45 and the light modulating element 44 form a light modulation unit.

The projection optical system 46 is an optical system for projecting light emitted from the light modulating element 44 to the diffuser panel 5. The projection optical system 46, the diffuser panel 5, the reflecting mirror 6, and the magnifier 7 form a projection unit.

The system control unit 48 controls the light source control unit 40, the drive unit 45, and the display device 8.

An information acquisition unit 47 acquires information necessary for determining the status of a field of vision in front of the windshield 1.

Figure 3:
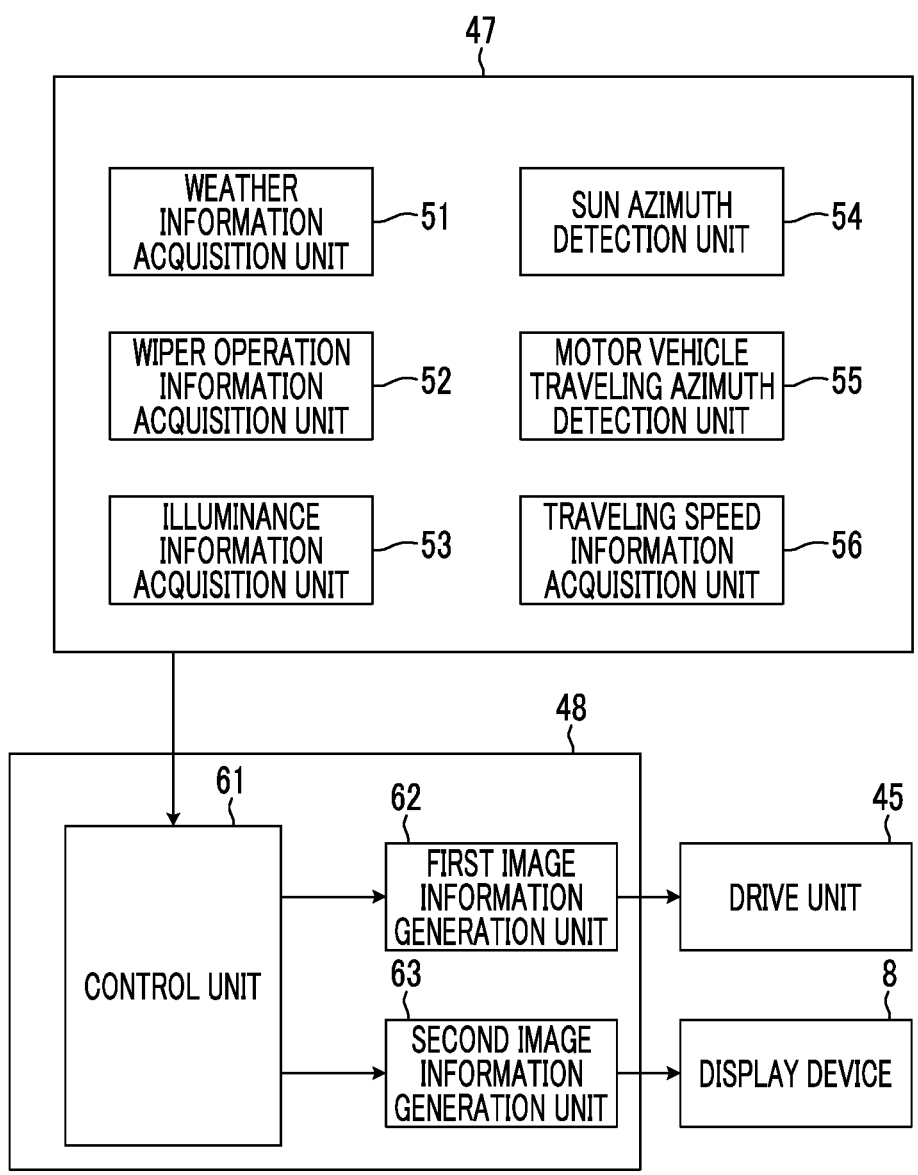
FIG. 3 is a diagram showing functional blocks of a system control unit 48 and an information acquisition unit 47.

FIG. 3 is a diagram showing functional blocks of the system control unit 48 and the information acquisition unit 47.

As shown in FIG. 3, the information acquisition unit 47 includes a weather information acquisition unit 51, a wiper operation information acquisition unit 52, an illuminance information acquisition unit 53, a sun azimuth detection unit 54, a motor vehicle traveling azimuth detection unit 55, and a traveling speed information acquisition unit 56. The system control unit 48 includes a control unit 61, a first image information generation unit 62, and a second image information generation unit 63.

The weather information acquisition unit 51 acquires weather information, and notifies the system control unit 48 of the acquired weather information. The weather information may include, for example, humidity detected by a humidity sensor provided in the motor vehicle, or weather data to be provided from a predetermined site through a network such as the Internet.

The wiper operation information acquisition unit 52 acquires operation information of wipers mounted on the motor vehicle from a unit for controlling the wipers of the motor vehicle, and notifies the system control unit 48 of the acquired wiper operation information. The wiper operation information includes wiper-on information indicating that the wipers are operating and wiper-off information indicating that the wipers are stopped.

The illuminance information acquisition unit 53 acquires illuminance information outside the motor vehicle, and notifies the system control unit 48 of the acquired illuminance information. The illuminance information acquisition unit 53 acquires, for example, illumination information detected by an illuminance sensor provided in the vicinity of the combiner 2. The illuminance sensor may be a sensor mounted in the motor vehicle.

The sun azimuth detection unit 54 detects the azimuth of the sun with respect to the position of the motor vehicle, and notifies the system control unit 48 of the detected the azimuth information. The azimuth of the sun may be detected from information about year, month, date and time and information (latitude and longitude) about a current position of the motor vehicle that may be acquired from a global positioning system (GPS) receiver (which is not shown) mounted on the motor vehicle.

The motor vehicle traveling azimuth detection unit 55 detects a traveling azimuth of the motor vehicle on the basis of information from the GPS receiver mounted in the motor vehicle, and notifies the system control unit 48 of the detected traveling azimuth information. The motor vehicle traveling azimuth detection unit 55 may detect the traveling azimuth of the motor vehicle by an electronic compass provided in the HUD.

The traveling speed information acquisition unit 56 acquires traveling speed information of the motor vehicle from a processor of the motor vehicle, and notifies the system control unit 48 of the acquired traveling speed information. The traveling speed information acquisition unit 56 may calculate and acquire the traveling speed information on the basis of information from an acceleration sensor provided in the HUD, for example. Further, the traveling speed information acquisition unit 56 may calculate and acquire the traveling speed information on the basis of information from the GPS receiver of the motor vehicle.

The control unit 61 selectively performs a first control and a second control on the basis of a variety of information notified from the information acquisition unit 47.

Specifically, the control unit 61 performs switching between the first control and the second control on the basis of the wiper operation information acquired by the wiper operation information acquisition unit 52. Further, the control unit 61 performs switching between the first control and the second control on the basis of the illuminance information acquired by the illuminance information acquisition unit 53. Further, the control unit 61 performs switching between the first control and the second control on the basis of a difference between the sun azimuth information detected by the sun azimuth detection unit 54 and the traveling azimuth information detected by the motor vehicle traveling azimuth detection unit 55. In addition, the control unit 61 performs switching between the first control and the second control on the basis of the traveling speed information acquired by the traveling speed information acquisition unit 56.

The first control is a control for operating both the first image information generation unit 62 and the second image information generation unit 63. The second control is a control for operating only the first image information generation unit 62.

The first image information generation unit 62 generates first image information to be output to the drive unit 45. The second image information generation unit 63 generates second image information to be output to the display device 8.

The first image information and the second image information are information to be informed to a driver for safe-driving. For example, the first image information and the second image information are information for notifying that gasoline is insufficient, information for notifying that a pedestrian comes close to the motor vehicle, information for notifying the traveling speed of the motor vehicle, navigation information, and the like.

Figure 4:
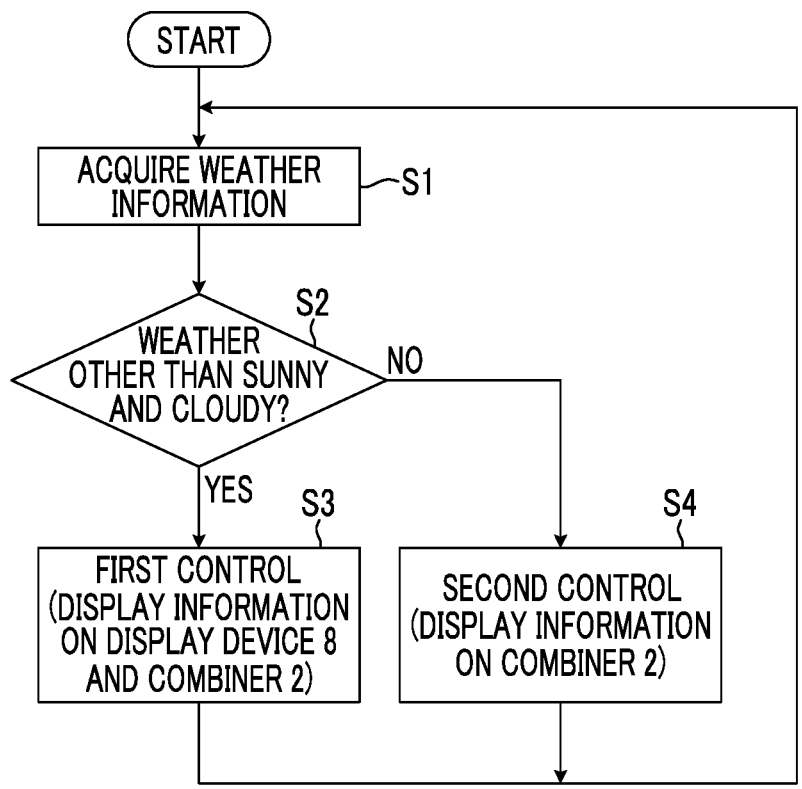
FIG. 4 is a flowchart illustrating an example of an operation of performing switching between a first control and a second control on the basis of weather information.

FIG. 4 is a flowchart illustrating an example of an operation of performing switching between the first control and the second control on the basis of the weather information acquired from the weather information acquisition unit 51 by the control unit 61. In the description of FIG. 4, specific processing content will be described with reference to display examples of FIGS. 5 and 6. Processes shown in FIG. 4 are repeatedly executed while power of the HUD is switched on.

The control unit 61 acquires the weather information acquired by the weather information acquisition unit 51 (step S1).

Then, the control unit 61 determines whether the acquired weather information from the weather information acquisition unit 51 indicates weather other than sunny and cloudy (that is, rainy or snowy) (step S2).

In a case where it is determined that the weather information indicates weather other than sunny and cloudy (step S2: YES), the control unit 61 performs the first control for operating both the first image information generation unit 62 and the second image information generation unit 63 (step S3). Here, the control unit 61 performs a control so that the information amount of the first image information is smaller than the information amount of the second image information.

By the first control, the first image information generation unit 62 generates the first image information, and outputs the generated first image information to the drive unit 45. Thus, the light modulating element 44 modulates light emitted from the light source unit 40A according to the first image information. The modulated light is projected onto the combiner 2 through the projection optical system 46, the diffuser panel 5, the reflecting mirror 6, and the magnifier 7. Further, by the first control, the second image information generation unit 63 generates the second image information, and outputs the generated second image information to the display device 8. Thus, an image based on the second information is displayed on the display device 8.

Figure 5:
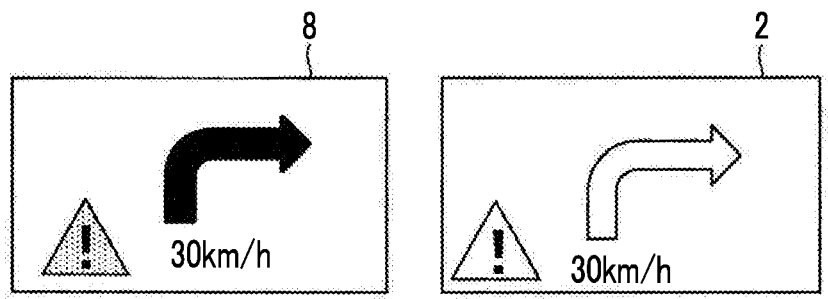
FIG. 5 is a diagram showing an image display example in the first control.

FIG. 5 is a display example illustrating the first control performed by the control unit 61.

As shown in FIG. 5, an image based on the first image information generated by the first image information generation unit 62 is displayed on the combiner 2 under the first control of the control unit 61. An image based on the second image information generated by the second image information generation unit 63 is displayed on the display device 8 under the first control of the control unit 61.

In the example of FIG. 5, the size of characters indicating the traveling speed to be projected onto the combiner 2 is set to a minimum visible size. In addition, an arrow indicating navigation information to be projected onto the combiner 2 and a warning mark for notifying warning show simplified displays (in which only outer frames are displayed and the insides of the outer frames are not painted).

In the example of FIG. 5, the size of characters indicating the traveling speed displayed on the display device 8 is set to be larger than the size of the characters to be projected onto the combiner 2. Further, an arrow indicating navigation information and a warning mark displayed on the display device 8 show standard displays (in which outer frames are painted with predetermined colors).

Returning to FIG. 4, in a case where it is determined that the weather information acquired from the weather information acquisition unit 51 indicates sunny or cloudy (step S2: NO), the control unit 61 performs the second control for operating only the first image information generation unit 62 (step S4).

The first image information generation unit 62 generates first image information under the second control, and outputs the generated first image information to the drive unit 45. Thus, the light modulating element 44 modulates light emitted from the light source unit 40A according to the first image information. The modulated light is projected onto the combiner 2 through the projection optical system 46, the diffuser panel 5, the reflecting mirror 6, and the magnifier 7.

Figure 6:
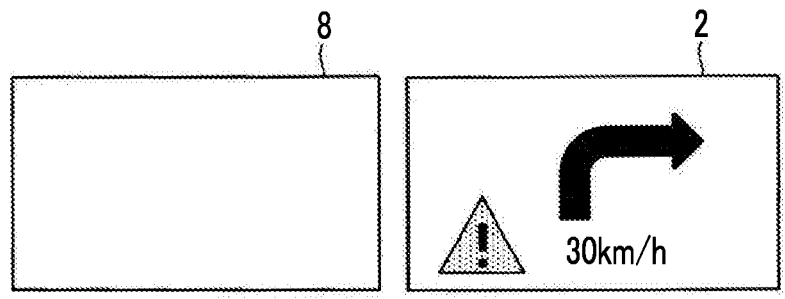
FIG. 6 is a diagram showing an image display example in the second control.

FIG. 6 is a display example illustrating the second control performed by the control unit 61.

As shown in FIG. 6, an image based on the first image information generated by the first image information generation unit 62 is displayed on the combiner 2 under the second control of the control unit 61. On the other hand, nothing is displayed on the display device 8. That is, in a situation where a field of vision is good, for example, in sunny or cloudy weather, the control unit 61 displays an image based on the first image information which is information to be informed to a driver only on the combiner 2.

In the example of FIG. 6, the image to be projected onto the combiner 2 is the same as the image displayed on the display device 8 in FIG. 5.

As described above, in a case where it is determined that the weather information indicates weather other than sunny and cloudy, the control unit 61 performs a control for reducing the amount of information to be displayed on the combiner 2. Thus, it is possible to secure a field of vision of the motor vehicle in the traveling direction. Further, in this case, an image based on the second image information is displayed on the display device 8. Thus, it is possible to provide sufficient information to the driver using the image. On the other hand, in a case where it is determined that the weather information indicates weather other than sunny or cloudy, the control unit 61 displays a lot of information on the combiner 2. Thus, it is possible to provide sufficient information to the driver, to thereby secure safety.

Figure 7:
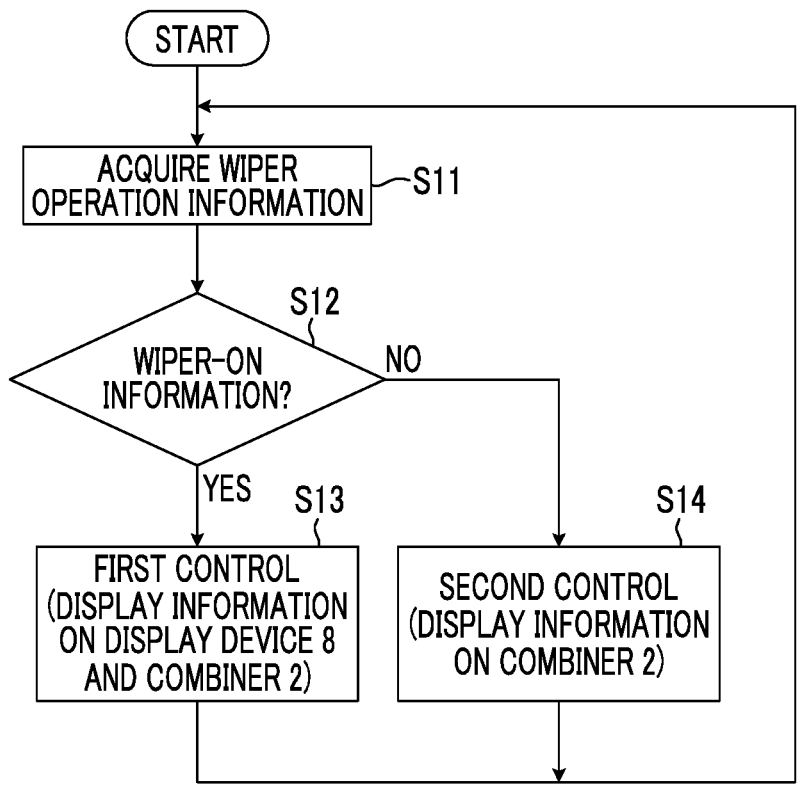
FIG. 7 is a flowchart illustrating an example of an operation of performing switching between the first control and the second control on the basis of wiper operation information.

FIG. 7 is a flowchart illustrating an example of an operation of performing switching between the first control and the second control on the basis of wiper operation information acquired from the wiper operation information acquisition unit 52 by the control unit 61. Processes shown in FIG. 7 are repeatedly executed while power of the HUD is switched on.

The control unit 61 acquires wiper operation information acquired by the wiper operation information acquisition unit 52 (step S11). Then, the control unit 61 determines whether the wiper operation information is wiper-on information (step S12). In a case where it is determined that the wiper operation information is the wiper-on information (step S12: YES), the control unit 61 performs the first control for operating both the first image information generation unit 62 and the second image information generation unit 63 (step S13). Here, the control unit 61 performs a control so that the information amount of the first image information is smaller than the information amount of the second image information.

In a case where it is determined that the wiper operation information is wiper-off information (step S12: NO), the control unit 61 performs the second control for operating only the first image information generation unit 62 (step S14).

In a case where the wiper operation information is the wiper-on information, it can be determined that the field of vision of the motor vehicle in the traveling direction is poor. In this case, the control unit 61 performs a control so that the amount of information to be displayed on the combiner 2 is reduced and information is also displayed on the display device 8. Thus, even in a situation where the field of vision of the motor vehicle in the traveling direction is poor, it is possible to provide sufficient information to a driver, to thereby secure safety while reducing the influence on visibility.

Figure 8:
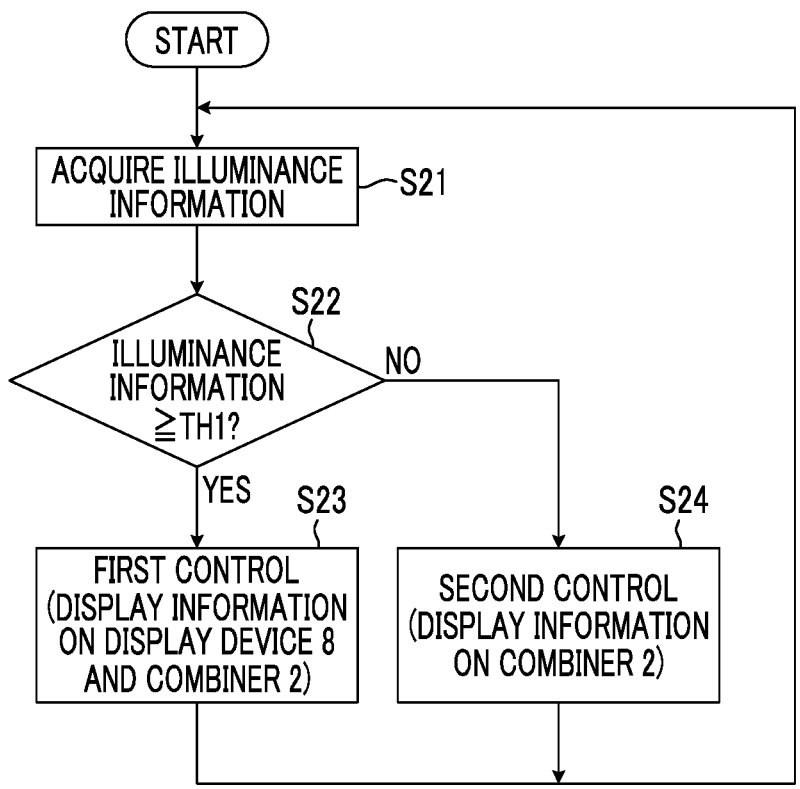
FIG. 8 is a flowchart illustrating an example of an operation of performing switching between the first control and the second control on the basis of illuminance information.

FIG. 8 is a flowchart illustrating an example of an operation of performing switching between the first control and the second control on the basis of illuminance information acquired from the illuminance information acquisition unit 53 by the control unit 61. Processes shown in FIG. 8 are repeatedly executed while power of the HUD is switched on.

The control unit 61 acquires illuminance information acquired by the illuminance information acquisition unit 53 (step S21). Then, the control unit 61 determines whether the illuminance information acquired from the illuminance information acquisition unit 53 is equal to or larger than a first threshold value TH1 (step S22).

In a case where it is determined that the illuminance information is equal to or larger than the first threshold value TH1 (step S22: YES), the control unit 61 performs the first control for operating both the first image information generation unit 62 and the second image information generation unit 63 (step S23). Here, the control unit 61 performs a control so that the information amount of the first image information is smaller than the information amount of the second image information.

In a case where it is determined that the illuminance information is smaller than the first threshold value TH1 (step S22: NO), the control unit 61 performs the second control for operating only the first image information generation unit 62 (step S24).

In a case where the illuminance information is equal to or larger than the first threshold value TH1, it can be determined that the field of vision in the traveling direction is in a dazzling situation, for example, in a state of bright daytime or backlight, or the like. Thus, in such a situation, the control unit 61 performs a control so that the amount of information to be displayed on the combiner 2 is reduced and information is also displayed on the display device 8. Thus, even in a situation where the field of vision of the motor vehicle in the traveling direction is poor, it is possible to provide sufficient information to a driver, to thereby secure safety while reducing the influence on visibility.

Figure 9:
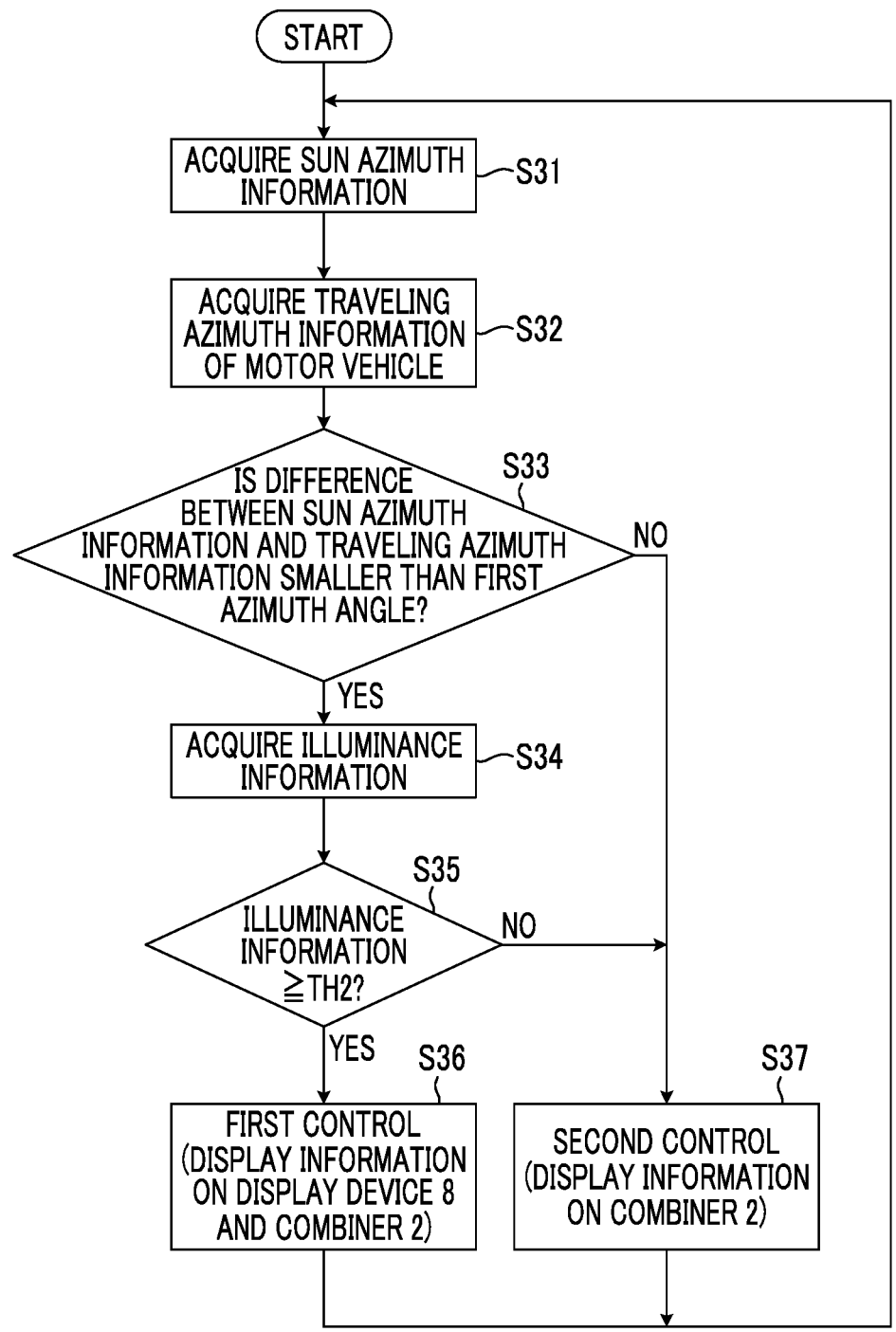
FIG. 9 is a flowchart illustrating an example of an operation of performing switching between the first control and the second control on the basis of azimuth information of the sun, traveling azimuth information of a motor vehicle, and illuminance information.

FIG. 9 is a flowchart illustrating an example of an operation of performing switching between the first control and the second control on the basis of sun azimuth information acquired from the sun azimuth detection unit 54, traveling azimuth information of the motor vehicle acquired from the motor vehicle traveling azimuth detection unit 55, and illuminance information acquired from the illuminance information acquisition unit 53, by the control unit 61. Processes shown in FIG. 9 are repeatedly executed while power of the HUD is switched on.

The control unit 61 acquires sun azimuth information detected by the sun azimuth detection unit 54 (step S31), and acquires traveling azimuth information of the motor vehicle detected by the motor vehicle traveling azimuth detection unit 55 (step S32). Then, the control unit 61 determines whether a difference between the sun azimuth information and the traveling azimuth information of the motor vehicle is smaller than a first azimuth angle (step S33).

In a case where the difference between the sun azimuth information and the traveling azimuth information of the motor vehicle is smaller than the first azimuth angle (step S33: YES), the control unit 61 acquires illuminance information acquired by the illuminance information acquisition unit 53 (step S34).

After step S34, the control unit 61 determines whether the acquired illuminance information is equal to or larger than a second threshold value TH2 (step S35). When the determination of step S35 is YES, the control unit 61 performs the first control for operating both the first image information generation unit 62 and the second image information generation unit 63 (step S36). Here, the control unit 61 performs a control so that the information amount of the first image information is smaller than the information amount of the second image information.

When the determination in step S35 is NO, or when the determination in step S33 is NO, the control unit 61 performs the second control for operating only the first image information generation unit 62 (step S37).

In a case where it is determined that the difference between the sun azimuth information and the traveling azimuth information of the motor vehicle is smaller than the first azimuth angle and it is determined that the illuminance information is equal to or larger than the second threshold value TH2, it can be determined that the motor vehicle is in a backlight state. Thus, in this case, the control unit 61 performs a control so that the amount of information to be displayed on the combiner 2 is reduced and information is also displayed on the display device 8. Thus, even in a situation where the field of vision of the motor vehicle in the traveling direction is poor due to backlight, it is possible to provide sufficient information to a driver, to thereby secure safety while reducing the influence on visibility.

In the flowchart shown in FIG. 9, step S34 and step S35 may be omitted, and when the determination in step S33 is YES, the process of step S36 may be performed. When the determination in step S33 is YES, it can be determined that the motor vehicle is in a backlight state where the sun exists in the traveling direction of the motor vehicle. Thus, by performing the process of step S36 when the determination in step S33 is YES, it is possible to provide sufficient information to a driver, to thereby secure safety while reducing the influence on visibility.

In the flowchart shown in FIG. 9, when the determination in step S33 is YES, it is further determined whether the illuminance information is equal to or larger than the second threshold value TH2, and it is determined which one of the first control and the second control is to be performed according to the determination result. Even if the sun exists in the traveling direction of the motor vehicle, in the case of cloudiness, the motor vehicle is not in the backlight state. For this reason, according to the flow shown in FIG. 9, it is possible to determine whether the motor vehicle is in the backlight state with high accuracy to perform switching between the first control and the second control.

Figure 10:
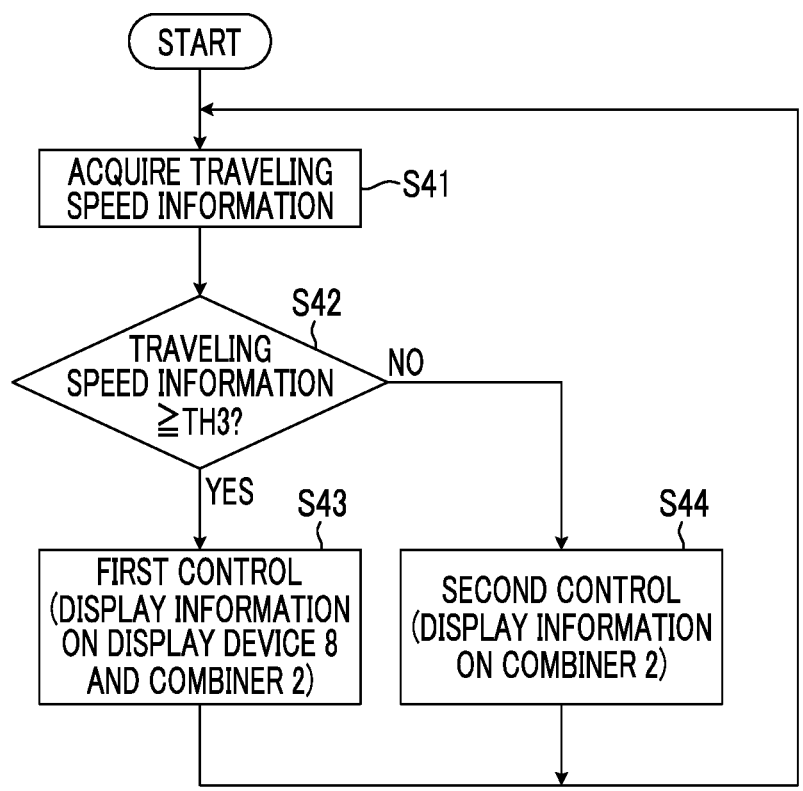
FIG. 10 is a flowchart illustrating an example of an operation of performing switching between the first control and the second control on the basis of traveling speed information.

FIG. 10 is a flowchart illustrating an example of an operation of performing switching between the first control and the second control on the basis of traveling speed information acquired from the traveling speed information acquisition unit 56 by the control unit 61. Processes shown in FIG. 10 are repeatedly executed while power of the HUD is switched on.

The control unit 61 acquires traveling speed information detected by the traveling speed information acquisition unit 56 (step S41). Then, the control unit 61 determines whether the acquired traveling speed information is equal to or larger than a third threshold value TH3 (step S42). In a case where the traveling speed information is equal to or larger than the third threshold value TH3 (step S42: YES), the control unit 61 performs the first control for operating both the first image information generation unit 62 and the second image information generation unit 63 (step S43). Here, the control unit 61 performs a control so that the information amount of the first image information is smaller than the information amount of the second image information.

In a case where the traveling speed information is smaller than the third threshold value TH3 (step S42: NO), the control unit 61 performs the second control for operating only the first image information generation unit 62 (step S44).

During high speed traveling, it is known that a field of vision of a driver is narrowed. Thus, when the determination in Step S42 is YES, the control unit 61 performs a control so that the amount of information to be displayed on the combiner 2 is reduced and information is also displayed on the display device 8. Thus, even in a situation where the field of vision of the motor vehicle in the traveling direction is poor, it is possible to provide sufficient information to a driver, to thereby secure safety while reducing the influence on visibility.

As a method for reducing the information amount of the first image information, a method for reducing a display region of an image or a method for displaying a simplified image may be employed. Further, for example, a method for lowering display brightness of an image or a method for changing a display color of an image may be employed.

Further, it is preferable that the switching is performed in stages from the display of only the combiner 2 based on the second control to the display of both the combiner 2 and the display device 8 based on the first control. With this configuration, it is possible to prevent a driver from feeling uncomfortable.

In addition, in the display switching, it is preferable to notify a driver of the switching using voice and message. With this configuration, the driver can recognize that a display destination of the information is switched, and there is no concern that the driver is confused.

Figure 11:
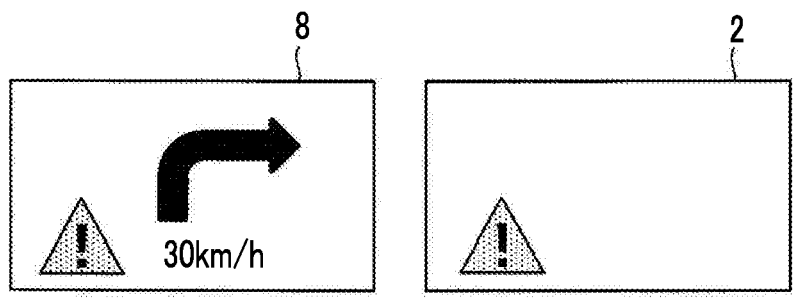
FIG. 11 is a diagram showing a modified example of an image displayed on a display device 8 and a combiner 2 in the first control.

FIG. 11 is a diagram showing a modified example of an image displayed on the display device 8 and the combiner 2 in the first control performed by the control unit 61. In the example of FIG. 5, by changing display methods of information while maintaining the number of pieces of information to be transmitted to a driver to be the same, visibility can be secured.

On the other hand, in the example of FIG. 11, by setting the number of pieces of information to be transmitted to a driver to be different from each other between the combiner 2 and the display device 8, visibility can be secured. That is, a part of information to be displayed on the combiner 2 is displayed on the display device 8 to secure visibility. According to the display example of FIG. 11, it is possible to further secure a field of vision of the driver. In this way, in the first control, in a case where the number of pieces of information to be displayed on the combiner 2 is set to be smaller than the number of pieces of information to be displayed on the display device 8, it is preferable that only warning information for warning to the driver is displayed on the combiner 2. In this way, it is possible to secure a field of vision, and to support safe-driving.

In the first control, the number of pieces of information to be displayed on the combiner 2 and the number of pieces of information to be displayed on the display device 8 may be set to be different from each other according to the size of traveling speed information. For example, as the size of the traveling speed information increases, a control may be performed so that the number of pieces of information to be displayed on the combiner 2 is reduced and the number of pieces of information to be displayed on the display device 8 is increased.

Further, for example, a control table as shown in FIG. 12 may be stored in a memory in advance, and the control unit 61 may control the display brightness or the display size of an image in display on the combiner 2 according to the control table.

According to the example of the control table shown in FIG. 12, in a case where the traveling speed information is equal to or larger than 120 km, only warning information is displayed on the combiner 2, and the display brightness and the display size of the warning information are set to 100% of a reference value. Further, in a case where the traveling speed information is equal to or larger than 60 km and smaller than 120 kin, the warning information and information other than the warning information are displayed on the combiner 2, in which the display brightness and the display size of the warning information are set to 100% of the reference value, and the display brightness and the display size of the other information are set to 50% of the reference value. In addition, in a case where the traveling speed information is smaller than 60 km, the warning information and information other than the warning information are displayed on the combiner 2, and the warning information and the other information are set so that the display brightness and the display size thereof are respectively set to 100% of the reference value.

That is, as the traveling speed becomes faster, the number of pieces of information to be displayed on the combiner 2 is reduced to lower the display brightness or reduce the display region, to thereby display necessary minimum information. Thus, it is possible to reduce the influence on visibility of a driver. Further, during high speed traveling, it is possible to limit information to be displayed on the combiner 2 to only warning information, to thereby secure visibility of a driver, and to clearly transmit important information to the driver. Furthermore, during high speed traveling, by reducing the amount of information to be displayed on the combiner 2, it is possible to reduce power consumption, to thereby enhance fuel efficiency.

An image diagram of the control table shown in FIG. 12 may be displayed on the combiner 2 or the display device 8 so that a driver can check the image diagram. Thus, the driver can recognize in advance a display switching state, and thus, does not feel uncomfortable during driving.

A program for causing a computer to execute the respective processes performed by the system control unit 48 and the information acquisition unit 47 of the embodiment may be provided. Such a program is stored in a computer-readable non-transitory recording medium.

The "computer readable recording medium" includes an optical medium such as a compact disc-ROM (CD-ROM), a magnetic recording medium such as a memory card, or the like. Further, the program may be provided by being downloaded through a network.

It should be noted that the presently disclosed embodiment is not limitative but illustrative in view of all points. The scope of the invention is not shown by the above description but is shown by claims, and is intended to include all modifications within meanings and ranges equivalent to the claims.

As described above, the present specification discloses the following matters.

A disclosed projection-type display device is a projection-type display device mounted on a motor vehicle, and includes a light modulation unit that modulates light emitted from a light source unit in accordance with input image information, a projection unit that projects the light modulated by the light modulation unit onto a projection surface, a first image information generation unit that generates first image information and outputs the first image information to the light modulation unit, a second image information generation unit that generates second image information and outputs the second image information to a display device mounted on the motor vehicle, and a control unit that controls operations of the first image information generation unit and the second image information generation unit.

In the disclosed projection-type display device, the control unit performs any one of a first control for operating both the first image information generation unit and the second image information generation unit and a second control for operating only the first image information generation unit.

The disclosed projection-type display device further includes a weather information acquisition unit that acquires weather information, and the control unit performs switching between the first control and the second control on the basis of the weather information acquired by the weather information acquisition unit.

In the disclosed projection-type display device, the control unit performs the first control in a case where the weather information indicates weather other than sunny and cloudy, and performs the second control in a case where the weather information indicates sunny or cloudy.

The disclosed projection-type display device further includes a wiper operation information acquisition unit that acquires operation information of a wiper mounted on the motor vehicle, and the control unit performs switching between the first control and the second control on the basis of the wiper operation information acquired by the wiper operation information acquisition unit.

In the disclosed projection-type display device, the control unit performs the first control in a case where the wiper operation information is information indicating that the wiper is operated, and performs the second control in a case where the wiper operation information is information indicating that the wiper is stopped.

The disclosed projection-type display device further includes an illuminance information acquisition unit that acquires illuminance information outside the motor vehicle, and the control unit performs switching between the first control and the second control on the basis of the illuminance information acquired by the illuminance information acquisition unit.

In the disclosed projection-type display device, the control unit performs the first control in a case where the illuminance information is equal to or larger than a first threshold value, and performs the second control in a case where the illuminance information is smaller than the first threshold value.

The disclosed projection-type display device further includes a sun azimuth detection unit that detects an azimuth of the sun and a motor vehicle traveling azimuth detection unit that detects a traveling azimuth of the motor vehicle, and the control unit performs switching between the first control and the second control on the basis of a difference between information about the azimuth of the sun detected by the sun azimuth detection unit and information about the traveling azimuth detected by the motor vehicle traveling azimuth detection unit.

In the disclosed projection-type display device, the control unit performs the first control in a case where the difference between the traveling azimuth information and the sun azimuth information is smaller than a first azimuth angle, and performs the second control in a case where the difference between the traveling azimuth information and the sun azimuth information is equal to or larger than the first azimuth angle.

The disclosed projection-type display device further includes an illuminance information acquisition unit that acquires illuminance information outside the motor vehicle, and the control unit performs the first control in a case where the difference between the traveling azimuth information and the sun azimuth information is smaller than the first azimuth angle and the illuminance information acquired by the illuminance information acquisition unit is equal to or larger than a second threshold value, performs the second control in a case where the difference between the traveling azimuth information and the sun azimuth information is smaller than the first azimuth angle and the illuminance information acquired by the illuminance information acquisition unit is smaller than the second threshold value, and performs the second control in a case where the difference between the traveling azimuth information and the sun azimuth information is equal to or larger than the first azimuth angle.

The disclosed projection-type display device further includes a traveling speed information acquisition unit that acquires traveling speed information of the motor vehicle, and the control unit performs switching between the first control and the second control on the basis of the traveling speed information acquired by the traveling speed information acquisition unit.

In the disclosed projection-type display device, the control unit performs the first control in a case where the traveling speed information is equal to or larger than a third threshold value, and performs the second control in a case where the traveling speed information is smaller than the third threshold value.

In the disclosed projection-type display device, in a case where the first control is performed, the control unit performs a control so that the information amount of the first image information generated by the first image information generation unit is smaller than the information amount of the second image information generated by the second image information generation unit.

In the disclosed projection-type display device, in a case where the first control is performed, the control unit performs a control so that the first image information generated by the first image information generation unit is set to only warning information for providing warning to a driver.

A disclosed safe-driving support method is a safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second image information to a display device mounted on the motor vehicle, and includes a control step of controlling operations of the first image information generation unit and the second image information generation unit.

In the safe-driving support method, in the control step, any one of a first control for operating both the first image information generation unit and the second image information generation unit and a second control for operating only the first image information generation unit is performed.

The disclosed safe-driving support method further includes a weather information acquisition step of acquiring weather information, and in the control step, switching between the first control and the second control is performed on the basis of the weather information acquired in the weather information acquisition step.

In the disclosed safe-driving support method, in the control step, the first control is performed in a case where the weather information indicates weather other than sunny and cloudy, and the second control is performed in a case where the weather information indicates sunny or cloudy.

The disclosed safe-driving support method further includes a wiper operation information acquisition step of acquiring operation information of a wiper mounted on the motor vehicle, and in the control step, switching between the first control and the second control is performed on the basis of the wiper operation information acquired in the wiper operation information step.

In the disclosed safe-driving support method, in the control step, the first control is performed in a case where the wiper operation information is information indicating that the wiper is operated, and the second control is performed in a case where the wiper operation information is information indicating that the wiper is stopped.

The disclosed safe-driving support method further includes an illuminance information acquisition step of acquiring illuminance information outside the motor vehicle, and in the control step, switching between the first control and the second control is performed on the basis of the illuminance information acquired in the illuminance information acquisition step.

In the disclosed safe-driving support method, in the control step, the first control is performed in a case where the illuminance information is equal to or larger than a first threshold value, and the second control is performed in a case where the illuminance information is smaller than the first threshold value.

The disclosed safe-driving support method further includes a sun azimuth detection step of detecting an azimuth of the sun, and a motor vehicle traveling azimuth detection step of detecting a traveling azimuth of the motor vehicle, and in the control step, switching between the first control and the second control is performed on the basis of a difference between information about the azimuth of the sun detected in the sun azimuth detection step and information about the traveling azimuth detected in the motor vehicle traveling azimuth detection step.

In the disclosed safe-driving support method, in the control step, the first control is performed in a case where the difference between the traveling azimuth information and the sun azimuth information is smaller than a first azimuth angle, and the second control is performed in a case where the difference between the traveling azimuth information and the sun azimuth information is equal to or larger than the first azimuth angle.

The disclosed safe-driving support method further includes an illuminance information acquisition step of acquiring illuminance information outside the motor vehicle, and in the control step, the first control is performed in a case where the difference between the traveling azimuth information and the sun azimuth information is smaller than the first azimuth angle and the illuminance information acquired in the illuminance information acquisition step is equal to or larger than a second threshold value, the second control is performed in a case where the difference between the traveling azimuth information and the sun azimuth information is smaller than the first azimuth angle and the illuminance information acquired in the illuminance information acquisition step is smaller than the second threshold value, and performs the second control in a case where the difference between the traveling azimuth information and the sun azimuth information is equal to or larger than the first azimuth angle.

The disclosed safe-driving support method further includes a traveling speed information acquisition step of acquiring traveling speed information of the motor vehicle, and in the control step, switching between the first control and the second control is performed on the basis of the traveling speed information acquired in the traveling speed information acquisition step.

In the disclosed safe-driving support method, in the control step, the first control is performed in a case where the traveling speed information is equal to or larger than a third threshold value, and the second control is performed in a case where the traveling speed information is smaller than the third threshold value.

In the disclosed safe-driving support method, in the control step, in a case where the first control is performed, a control is performed so that the information amount of the first image information generated by the first image information generation unit is smaller than the information amount of the second image information generated by the second image information generation unit.

In the disclosed safe-driving support method, in the control step, in a case where the first control is performed, a control is performed so that the first image information generated by the first image information generation unit is set to only warning information for providing warning to a driver.

A disclosed non-transitory computer readable recording medium storing a safe-driving support program is a non-transitory computer readable recording medium storing a safe-driving support program that causes a computer to execute a safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second image information to a display device mounted on the motor vehicle, in which the safe-driving support method includes a control step of controlling operations of the first image information generation unit and the second image information generation unit.

INDUSTRIAL APPLICABILITY

The invention is effective and provides high convenience, particularly, in application to an HUD for a motor vehicle.

EXPLANATION OF REFERENCES

1: windshield
2: combiner
4: display unit
5: diffuser panel
6: mirror
7: magnifier
8: display device
40A: light source unit
44: light modulating element
45: drive unit
46: projection optical system
47: information acquisition unit
48: system control unit
61: control unit
62: first image information generation unit
63: second image information generation unit

What is claimed is:

1. A projection-type display device mounted on a motor vehicle, comprising:
a light modulation unit that modulates light emitted from a light source unit in accordance with input image information;
a projection unit that projects the light modulated by the light modulation unit onto a projection surface;
a first image information generation unit that generates first image information and outputs the first image information to the light modulation unit;
a second image information generation unit that generates second image information and outputs the second image information to a display device mounted on the motor vehicle;
a control unit that controls operations of the first image information generation unit and the second image information generation unit, the control unit performing any one of a first control for operating both the first image information generation unit and the second image information generation unit and a second control for operating only the first image information generation unit; and
a traveling speed information acquisition unit that acquires traveling speed information of the motor vehicle,
wherein the control unit performs switching between the first control and the second control on the basis of the traveling speed information acquired by the traveling speed information acquisition unit, and
wherein in a case where the first control is performed, the control unit performs a control so that the information amount of the first image information generated by the first image information generation unit is smaller than the information amount of the second image information generated by the second image information generation unit and the information amount of the first image information is reduced as the traveling speed becomes faster.

2. The projection-type display device according to claim 1, further comprising:
a weather information acquisition unit that acquires weather information,
wherein the control unit performs switching between the first control and the second control on the basis of the weather information acquired by the weather information acquisition unit.

3. The projection-type display device according to claim 2,
wherein the control unit performs the first control in a case where the weather information indicates weather other than sunny and cloudy, and performs the second control in a case where the weather information indicates sunny or cloudy.

4. The projection-type display device according to claim 1, further comprising:
a wiper operation information acquisition unit that acquires operation information of a wiper mounted on the motor vehicle,
wherein the control unit performs switching between the first control and the second control on the basis of the wiper operation information acquired by the wiper operation information acquisition unit.

5. The projection-type display device according to claim 4,
wherein the control unit performs the first control in a case where the wiper operation information is information indicating that the wiper is operated, and performs the second control in a case where the wiper operation information is information indicating that the wiper is stopped.

6. The projection-type display device according to claim 1, further comprising:
an illuminance information acquisition unit that acquires illuminance information outside the motor vehicle,
wherein the control unit performs switching between the first control and the second control on the basis of the illuminance information acquired by the illuminance information acquisition unit.

7. The projection-type display device according to claim 6,
wherein the control unit performs the first control in a case where the illuminance information is equal to or larger than a first threshold value, and performs the second control in a case where the illuminance information is smaller than the first threshold value.

8. The projection-type display device according to claim 1, further comprising:
a sun azimuth detection unit that detects an azimuth of the sun; and
a motor vehicle traveling azimuth detection unit that detects a traveling azimuth of the motor vehicle,
wherein the control unit performs switching between the first control and the second control on the basis of a difference between information about the azimuth of the sun detected by the sun azimuth detection unit and information about the traveling azimuth detected by the motor vehicle traveling azimuth detection unit.

9. The projection-type display device according to claim 8,
wherein the control unit performs the first control in a case where the difference between the traveling azimuth information and the sun azimuth information is smaller than a first azimuth angle, and performs the second control in a case where the difference between the traveling azimuth information and the sun azimuth information is equal to or larger than the first azimuth angle.

10. The disclosed projection-type display device according to claim 8, further comprising:
an illuminance information acquisition unit that acquires illuminance information outside the motor vehicle,
wherein the control unit performs the first control in a case where the difference between the traveling azimuth information and the sun azimuth information is smaller than the first azimuth angle and the illuminance information acquired by the illuminance information acquisition unit is equal to or larger than a second threshold value, performs the second control in a case where the difference between the traveling azimuth information and the sun azimuth information is smaller than the first azimuth angle and the illuminance information acquired by the illuminance information acquisition unit is smaller than the second threshold value, and performs the second control in a case where the difference between the traveling azimuth information and the sun azimuth information is equal to or larger than the first azimuth angle.

11. The disclosed projection-type display device according to claim 1,
wherein the control unit performs the first control in a case where the traveling speed information is equal to or larger than a third threshold value, and performs the second control in a case where the traveling speed information is smaller than the third threshold value.

12. The projection-type display device according to claim 1,
wherein in a case where the first control is performed, the control unit performs a control so that the first image information generated by the first image information generation unit is set to only warning information for providing warning to a driver.

13. A safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second image information to a display device mounted on the motor vehicle, the method comprising:
a control step of controlling operations of the first image information generation unit and the second image information generation unit, and performing any one of a first control for operating both the first image information generation unit and the second image information generation unit and a second control for operating only the first image information generation unit; and
a traveling speed information acquisition step of acquiring traveling speed information of the motor vehicle,
wherein in the control step, switching between the first control and the second control is performed on the basis of the traveling speed information acquired in the traveling speed information acquisition step, and
wherein in the control step, in a case where the first control is performed, a control is performed so that the information amount of the first image information generated by the first image information generation unit is smaller than the information amount of the second image information generated by the second image information generation unit and the information amount of the first image information is reduced as the traveling speed becomes faster.

14. The safe-driving support method according to claim 13, further comprising:
a weather information acquisition step of acquiring weather information,
wherein in the control step, switching between the first control and the second control is performed on the basis of the weather information acquired in the weather information acquisition step.

15. The safe-driving support method according to claim 14,
wherein in the control step, the first control is performed in a case where the weather information indicates weather other than sunny and cloudy, and the second control is performed in a case where the weather information indicates sunny or cloudy.

16. The safe-driving support method according to claim 13, further comprising:
a wiper operation information acquisition step of acquiring operation information of a wiper mounted on the motor vehicle, wherein in the control step, switching between the first control and the second control is performed on the basis of the wiper operation information acquired in the wiper operation information step.

17. The safe-driving support method according to claim 16,
wherein in the control step, the first control is performed in a case where the wiper operation information is information indicating that the wiper is operated, and the second control is performed in a case where the wiper operation information is information indicating that the wiper is stopped.

18. The safe-driving support method according to claim 13, further comprising:
an illuminance information acquisition step of acquiring illuminance information outside the motor vehicle,
wherein in the control step, switching between the first control and the second control is performed on the basis of the illuminance information acquired in the illuminance information acquisition step.

19. The safe-driving support method according to claim 18,
wherein in the control step, the first control is performed in a case where the illuminance information is equal to or larger than a first threshold value, and the second control is performed in a case where the illuminance information is smaller than the first threshold value.

20. The safe-driving support method according to claim 13, further comprising:
a sun azimuth detection step of detecting an azimuth of the sun; and
a motor vehicle traveling azimuth detection step of detecting a traveling azimuth of the motor vehicle,
wherein in the control step, switching between the first control and the second control is performed on the basis of a difference between information about the azimuth of the sun detected in the sun azimuth detection step and information about the traveling azimuth detected in the motor vehicle traveling azimuth detection step.

21. The safe-driving support method according to claim 20,
wherein in the control step, the first control is performed in a case where the difference between the traveling azimuth information and the sun azimuth information is smaller than a first azimuth angle, and the second control is performed in a case where the difference between the traveling azimuth information and the sun azimuth information is equal to or larger than the first azimuth angle.

22. The safe-driving support method according to claim 20, further comprising:
an illuminance information acquisition step of acquiring illuminance information outside the motor vehicle,
wherein in the control step, the first control is performed in a case where the difference between the traveling azimuth information and the sun azimuth information is smaller than the first azimuth angle and the illuminance information acquired in the illuminance information acquisition step is equal to or larger than a second threshold value, the second control is performed in a case where the difference between the traveling azimuth information and the sun azimuth information is smaller than the first azimuth angle and the illuminance information acquired in the illuminance information acquisition step is smaller than the second threshold value, and performs the second control in a case where the difference between the traveling azimuth information and the sun azimuth information is equal to or larger than the first azimuth angle.

23. The safe-driving support method according to claim 13,
wherein in the control step, the first control is performed in a case where the traveling speed information is equal to or larger than a third threshold value, and the second control is performed in a case where the traveling speed information is smaller than the third threshold value.

24. The safe-driving support method according to claim 13,
wherein in the control step, in a case where the first control is performed, a control is performed so that the first image information generated by the first image information generation unit is set to only warning information for providing warning to a driver.

25. A non-transitory computer readable recording medium storing a safe-driving support program that causes a computer to execute a safe-driving support method in a projection-type display device that includes a light modulation unit that modulates light emitted from a light source unit mounted on a motor vehicle in accordance with input image information, a projection unit that projects the light modulated by the light modulation unit onto a projection surface mounted on the motor vehicle, a first image information generation unit that generates first image information and outputs the first image information to the light modulation unit, and a second image information generation unit that generates second image information and outputs the second image information to a display device mounted on the motor vehicle,
wherein the safe-driving support method includes a control step of controlling operations of the first image information generation unit and the second image information generation unit and performing any one of a first control for operating both the first image information generation unit and the second image information generation unit and a second control for operating only the first image information generation unit, and a traveling speed information acquisition step of acquiring traveling speed information of the motor vehicle,
wherein in the control step, switching between the first control and the second control is performed on the basis of the traveling speed information acquired in the traveling speed information acquisition step, and
wherein in the control step, in a case where the first control is performed, a control is performed so that the information amount of the first image information generated by the first image information generation unit is smaller than the information amount of the second image information generated by the second image information generation unit and the information amount of the first image information is reduced as the traveling speed becomes faster.

* * * * *